United States Patent
O'Gorman et al.

(10) Patent No.: US 12,283,839 B1
(45) Date of Patent: Apr. 22, 2025

(54) SYSTEMS AND METHODS FOR PRECOOLING A BUILDING USING A VEHICLE

(71) Applicant: Ford Global Technologies, LLC, Dearborn, MI (US)

(72) Inventors: Ryan O'Gorman, Beverly Hills, MI (US); Stuart C. Salter, White Lake, MI (US); Peter Phung, Windsor (CA); Brendan Diamond, Grosse Pointe, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 39 days.

(21) Appl. No.: 18/487,099

(22) Filed: Oct. 15, 2023

(51) Int. Cl.
  *H02J 7/34* (2006.01)
  *B60L 55/00* (2019.01)
  *H02J 7/00* (2006.01)

(52) U.S. Cl.
  CPC .............. *H02J 7/34* (2013.01); *H02J 7/0048* (2020.01); *B60L 55/00* (2019.02); *H02J 2310/12* (2020.01)

(58) Field of Classification Search
  CPC ........ H02J 7/34; H02J 7/0048; H02J 2310/12; B60L 55/00
  See application file for complete search history.

(56) References Cited

U.S. PATENT DOCUMENTS

| | | | |
|---|---|---|---|
| 8,872,379 B2 | 10/2014 | Ruiz et al. | |
| 11,413,984 B2 | 8/2022 | Yang et al. | |
| 2014/0306833 A1 | 10/2014 | Ricci | |
| 2017/0072810 A1 | 3/2017 | Cun | |
| 2021/0370795 A1* | 12/2021 | Kydd | H02J 3/322 |
| 2023/0182614 A1 | 6/2023 | Mo et al. | |

OTHER PUBLICATIONS

Genove Oil & Air, Inc., Should You Get a Thermostat With Geofencing Technology?, Jun. 17, 2022, pp. 1-7.

* cited by examiner

*Primary Examiner* — Carlos Amaya
(74) *Attorney, Agent, or Firm* — Emily Drake; Eversheds Sutherland (US) LLP

(57) ABSTRACT

A vehicle configured to transfer energy to a building is disclosed. The vehicle may include a transceiver and a processor. The transceiver may receive temperature information and demand information associated with a power grid. The processor may determine that a first predefined condition may be met based on the demand information. The processor may then calculate a first amount of energy to be transferred to the building based on the temperature information, and cause the vehicle to transfer the first amount of energy to the building. The processor may further determine that a second predefined condition may be met based on the first amount of energy and/or vehicle availability information, and determine a second amount of energy to be transferred to the building based on the temperature information. The processor may then cause the vehicle to transfer the second amount of energy to the building.

20 Claims, 9 Drawing Sheets

SYSTEMS AND METHODS FOR PRECOOLING A BUILDING USING A VEHICLE

FIELD

The present disclosure relates to systems and methods for precooling a building by using energy drawn from a bi-directional Electric Vehicle (EV).

BACKGROUND

Bi-directional Electrical Vehicles (EVs) are configured to receive as well as supply energy to a charger. The bi-directional energy transfer feature enables the EVs to supply energy to other vehicles, buildings, equipment, etc. For example, an EV may supply energy from an EV battery to a building (e.g., a house) when the building requires excess energy and the power grid may not be able to meet the building's energy requirements. The EV may also supply energy to the building to optimize consumer's spend on energy obtained from the power grid, e.g., during those time durations of the day when charges for the energy drawn from the power grid may be high. The EV may specifically facilitate to optimize consumer's spend on energy when the energy may be used to operate building components that typically draw considerable power, e.g., heating, ventilation, and air conditioning (HVAC) systems.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
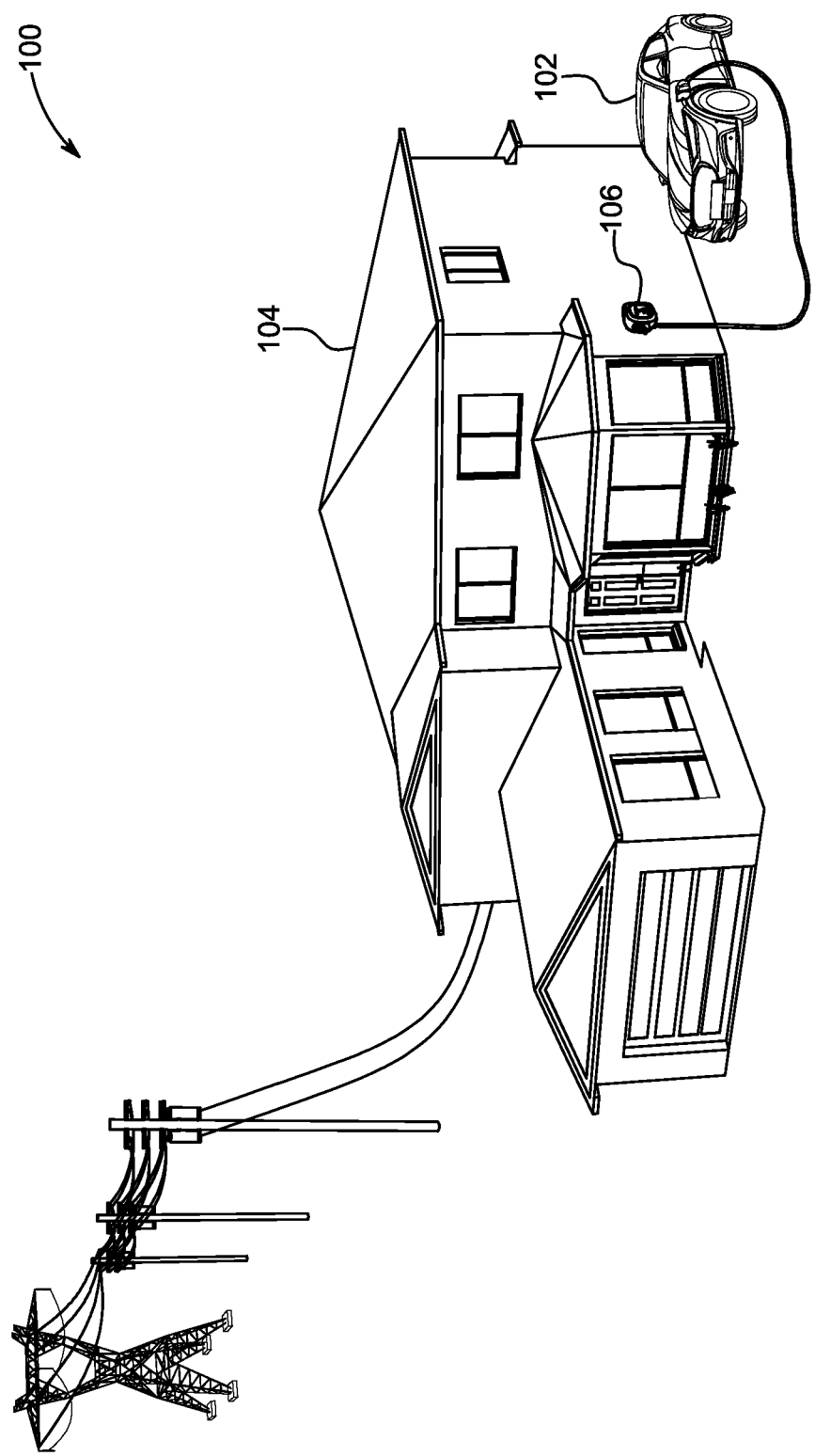
FIG. 1 depicts an example environment in which techniques and structures for providing the systems and methods disclosed herein may be implemented.

The present disclosure describes a bi-directional Electric Vehicle (EV) that may be configured to supply energy to a building to operate one or more building equipment, e.g., a building heating, ventilation, and air conditioning (HVAC) system. The vehicle may transfer energy to the building when, for example, electricity cost, demand, or tariff associated with energy drawn from a utility power grid may be high, thereby enabling a building owner (user) to optimize spend on energy drawn from the power grid. The vehicle may be configured to obtain electricity cost/demand/tariff information associated with the energy supplied by the power grid and determine time durations associated with high electricity cost/demand/tariff (or "high energy demand time duration") based on the demand/tariff information. At the start of the high energy demand time duration, the vehicle may automatically calculate an amount of energy per unit time (e.g., a first amount of energy) required to be transferred to the building to operate the HVAC system and may start to transfer the first amount of energy to the building when the vehicle has enough battery state of charge (SoC) level to supply the energy to the building. When the building receives the energy from the vehicle, the building may not be required to draw energy from the power grid, thereby conserving user's spend on high electricity cost for energy drawn from the power grid during the high energy demand time duration.

In some aspects, the vehicle may calculate the first amount of energy based on temperature information and an HVAC load profile. The temperature information may include, for example, a set point or desired building temperature preset by the user, a real-time building temperature, a real-time ambient temperature, a maximum acceptable building temperature, and a minimum acceptable building temperature. In an exemplary aspect, the vehicle may calculate the first amount of energy based on the set point temperature, the real-time building temperature, the real-time ambient temperature and the HVAC load profile.

When the vehicle may be supplying energy to the building during the high energy demand time duration, the vehicle may determine whether the vehicle may be required to depart from the building within the high energy demand time duration and/or the vehicle may reach to an energy transfer limit while supplying energy to the building during the high energy demand time duration. In some aspects, the vehicle may determine that the vehicle may be required to depart from the building based on historical vehicle availability and travel information and/or based on user inputs. Further, the vehicle may determine that the vehicle may reach to the energy transfer limit when the vehicle determines that by transferring the first amount of energy to the building, the vehicle may reach to a minimum battery SoC level and/or a minimum vehicle range level (that may be preset by the user) within the high energy demand time duration. Responsive to such determination, the vehicle may determine that the vehicle may be required to precool the building, before the vehicle departs from the building or the energy transfer limit may be reached.

In some aspects, to precool the building, the vehicle may calculate a second amount of energy (that may be greater than the first amount of energy) that the vehicle may be required to transfer to the building. The vehicle may calculate the second amount of energy based on the real-time building temperature, the real-time ambient temperature, the minimum acceptable building temperature, and the HVAC profile. In some aspects, the vehicle may precool the building to a temperature level even below the minimum acceptable building temperature when the building may be unoccupied (e.g., when the vehicle may be expected to be away from the building).

In some aspects, the vehicle may determine a time duration, a start time and an end time to supply the second amount of energy to the building based on the vehicle's expected departure time from the building, an expected trip duration, an expected time when the energy transfer limit may be reached, availability of other vehicles to supply energy to the building and their respective battery SoC levels, and/or the like.

Responsive to calculating the second amount of energy and determining the start/end time and time duration to supply the second amount of energy, the vehicle may supply the second amount of energy to the building to precool the building. Since the building may be precooled by the vehicle before the vehicle stops transferring energy to the building to operate the HVAC system, lesser amount of energy may be required to be drawn from the power grid to operate the HVAC system, thereby enabling reduction in spend on energy obtained from the power grid.

The present disclosure discloses a vehicle that may supply energy to the building to operate the HVAC system during the high energy demand time duration, thereby enabling the user to optimize spend on energy drawn from the power grid. Further, the vehicle may precool the building before the vehicle may be unavailable to supply energy to the building, thereby enabling the building to draw lesser amount of energy from the power grid to operate the HVAC system. Precooling the building further assists in optimizing user's spend on energy drawn from the power grid.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 and a building 104 (or a house 104). The vehicle 102 may take the form of any passenger or commercial vehicle such as, for example, a car, a work vehicle, a crossover vehicle, a truck, a van, a minivan, a taxi, a bus, etc. The vehicle 102 may be a manually driven vehicle and/or may be configured to operate in a partially or fully autonomous mode. In some aspects, the vehicle 102 may be a bi-directional Electric Vehicle (EV) that may be configured to receive and supply energy from/to other vehicles, chargers, buildings, equipment, and/or the like. In an exemplary aspect, the vehicle 102 may be configured to supply energy to the house 104 via a charger point 106, which may be installed in the house 104 (as shown in FIG. 1) or anywhere in proximity to the house 104.

The house 104 may include one or more house equipment that may be powered by energy drawn from utility power grid and/or the vehicle 102. Examples of house equipment include, but are not limited to, a heating, ventilation, and air conditioning (HVAC) system (shown as HVAC 216 in FIG. 2), fans, lights, electronic equipment, and/or the like. In some aspects, the vehicle 102 may supply energy to the house 104 to power the house equipment (e.g., the HVAC system) when the energy requirements of the house 104 may be greater than the energy that the power grid may provide, or when charges for energy drawn from the power grid may be high, or when a house/vehicle owner requests (via a user device) the vehicle 102 to supply energy to the house 104. For example, a vehicle or house owner may request the vehicle 102 to supply energy to the house 104 to operate the HVAC system during morning or evening time when the charges for energy used from the power grid may be high and may enable the HVAC system to operate via the energy drawn from the power grid during afternoons when the corresponding charges may be low.

The scenarios described above for supplying energy from the vehicle 102 to the house 104 are exemplary in nature and for illustrative purpose only. The described scenarios should not be construed as limiting. The vehicle or house owner may request the vehicle 102 to supply energy to the house 104 at any time, based on user requirements and/or energy supply or requirement conditions.

In some aspects, the house 104 may include a thermostat (shown as thermostat 214 in FIG. 2) that may be configured to control HVAC system operation, measure a real-time house interior portion temperature (or house temperature associated with the house 104), and enable a user (e.g., the house owner) to control the house temperature. For example, the user may input a set point temperature associated with the house 104 on the thermostat. The set point temperature may be, for example, a temperature desired by the user for the house 104. The thermostat may be configured to activate and/or deactivate the HVAC system based on the house temperature and the set point temperature. For example, the thermostat may switch ON the Air Conditioner (AC) when the house temperature may be higher than the set point temperature and may switch OFF the AC when the house temperature may be lower than or equivalent to the set point temperature.

In some aspects, in addition to inputting the set point temperature, the user may input a maximum acceptable house temperature and a minimum acceptable house temperature on the thermostat. The maximum acceptable house temperature may be a temperature above the set point temperature up to which the user may accept the house temperature to be achieved by the HVAC system, and the minimum acceptable house temperature may be a temperature below the set point temperature up to which the user may accept the house temperature to be achieved by the HVAC system. While the user may desire the HVAC system to ideally achieve the set point temperature for most of the time in the house 104, the user may accept a higher (i.e., the maximum acceptable house temperature) or lower temperature (i.e., the minimum acceptable house temperature) than the set point temperature when the electricity cost associated with the energy drawn from the power grid may be high. The user may accept the higher or lower temperature to optimize user's spend on energy drawn from the power grid. As an example, if the energy drawn from the power grid between 4 to 9 PM may be higher than other times of the day, the user may accept a higher house temperature of 77 degrees Fahrenheit and/or a lower house temperature of 60 degrees Fahrenheit between 4 to 9 PM to optimize user's spend on energy drawn from the power grid, while the set point temperature (or ideal desired house temperature) may be 68 degrees Fahrenheit.

The vehicle 102 may be communicatively coupled with the thermostat and configured to obtain the real-time house temperature, the set point temperature, and the minimum and maximum acceptable house temperature from the thermostat. The vehicle 102 may be further configured to control HVAC system operation via the thermostat based on the temperature information described above. For example, the vehicle 102 may transmit command signals to the thermostat to switch ON or OFF the HVAC system based on the temperature information to optimize the supply of energy from the vehicle 102, when the vehicle 102 may be supplying energy to the house 104.

To optimize user's spend on energy resources, the vehicle 102 may be configured to determine high electricity cost/energy demand/tariff time durations (e.g., between 4 to 9 PM) of the day when the electricity cost, demand, or tariff associated with the energy drawn from the power grid may be high and may automatically commence energy transfer from the vehicle 102 to the house 104 during such time durations. For example, the vehicle 102 may automatically commence energy transfer from the vehicle 102 to the house 104 to operate the HVAC system between 4 to 9 PM when the vehicle 102 may be electrically coupled with the charger point 106 and may cut/stop energy supply from the power grid to the house 104. In this manner, the vehicle 102 may facilitate the user (e.g., the house owner) in optimizing user's spend on energy drawn from the power grid.

In some aspects, the vehicle 102 may automatically determine the time durations of high electricity cost/demand/tariff associated with the energy drawn from the power grid based on energy demand information obtained from a server managed by a power utility firm. In other aspects, the user may transmit, e.g., via a user device, the energy demand information to the vehicle 102. In this case, the vehicle 102 may commence energy transfer from the vehicle 102 to the house 104 based on user inputs.

When the vehicle 102 may be required to commence energy transfer to the house 104, the vehicle 102 may first calculate an amount of energy per unit time (e.g., a first amount of energy) that the vehicle 102 may be required to transfer to the house 104 to operate the HAVC system based on the set point temperature and a load profile of the HVAC system (or "HVAC load profile"). For example, if the set point temperature is 68 degrees Fahrenheit, the vehicle 102 may calculate the first amount of energy that may be required to be transferred to the house 104 by the vehicle 102 to achieve the house temperature of 68 degrees Fahrenheit.

In some aspects, the vehicle 102 may calculate the first amount of energy based on temperature information including a real-time house temperature and the set point temperature (that the vehicle 102 may obtain from the thermostat) and ambient temperature that the vehicle 102 may determine by using vehicle's ambient temperature sensor. Further, as described above, the vehicle 102 may calculate the first amount of energy based on the HVAC load profile. In some aspects, the vehicle 102 may obtain the HVAC load profile from an external server or the HVAC load profile may be pre-stored in a vehicle memory (shown as memory 226 in FIG. 2).

In some aspects, the HVAC load profile may be indicative of an expected load or energy that the HVAC system may draw from the vehicle 102 at a specific set point temperature, a specific ambient temperature and a specific house temperature. For example, the HVAC load profile may indicate an expected first energy that the HVAC system may draw from the vehicle 102 to cool a house temperature of 80 degrees Fahrenheit to a set point temperature of 75 degrees Fahrenheit, when the ambient temperature may be 85 degrees Fahrenheit. As another example, the HVAC load profile may indicate an expected second energy that the HVAC system may draw from the vehicle 102 to cool a house temperature of 85 degrees Fahrenheit to a set point temperature of 75 degrees Fahrenheit, when the ambient temperature may be 90 degrees Fahrenheit.

A person ordinarily skilled in the art may appreciate that the expected first energy described above may be different from the expected second energy, as the HVAC system may require more energy to cool the house 104 when the ambient temperature and/or the house temperature may be high. In some aspects, the HVAC load profile may also depend on the house 104, e.g., a type of insulation in the house 104, a house location (e.g., height above the sea-level), typical humidity level in a geographical area where the house 104 may be located, and/or the like.

The vehicle 102 may calculate the first amount of energy based on the temperature information described above and the HVAC load profile. Responsive to calculating the first amount of energy, the vehicle 102 may determine/check whether the first amount of energy may be less than a maximum energy transfer threshold (that may be pre-set by the user) and/or whether a vehicle battery may have enough state of charge (SoC) level or vehicle range remaining (e.g., more than 100 or 120 miles) to provide the first amount of energy to the house 104 to operate the HVAC. The vehicle 102 may commence the energy transfer to the house 104 when the vehicle 102 determines that enough SoC level/vehicle range (e.g., greater than a predefined threshold) is present in the vehicle 102, and/or the first amount of energy is less than the maximum energy transfer threshold.

In some aspects, when the vehicle 102 may be transferring the first amount of energy to the house 104 during the high electricity cost/energy demand/tariff time duration (e.g., between 4 to 9 PM), the vehicle 102 may determine whether the vehicle 102 may be required to disconnect from the charger point 106 at any time between the high electricity cost/energy demand/tariff time duration (e.g., between 4 to 9 PM) or if an energy transfer limit associated with the vehicle 102 may be reached any time within the high electricity cost/energy demand/tariff time duration. In some aspects, the vehicle 102 may be required to disconnect from the charger point 106 when the vehicle 102 may be required to depart from the house 104 (e.g., when the user may require the vehicle 102 for mobility purpose). In this case, the vehicle 102 may determine that the vehicle 102 may be required to depart from the house 104 based on historical vehicle usage or availability information that may be pre-stored in the vehicle memory or the vehicle 102 may obtain such information from an external server. In some aspects, the historical vehicle availability information may include historical vehicle travel information, historical information associated with energy transfer from the vehicle 102 to the house 104, an expected or typical vehicle departure time from the house 104 on each day, an expected vehicle return time to the house 104 on each day, and an expected vehicle trip duration associated with each vehicle trip.

In some aspects, the vehicle 102 may determine that the vehicle 102 may be required to depart from the house 104 during the high electricity cost/energy demand/tariff time duration (e.g., between 4 to 9 PM) based on the expected or typical vehicle departure time from the house 104 on each day, as determined from the historical vehicle availability information. In other aspects, the vehicle 102 may determine that the vehicle 102 may be required to depart from the house 104 during the high electricity cost/energy demand/tariff time duration based on user inputs. For example, when the user activates vehicle ignition or opens vehicle door (or driver door), the vehicle 102 may determine that the vehicle 102 may be required to depart from the house 104.

In some aspects, the vehicle 102 may determine that the energy transfer limit associated with the vehicle 102 may be reached any time within the high electricity cost/energy demand/tariff time duration based on the first amount of energy that the vehicle 102 may be transferring per unit time to the house 104 and the vehicle battery SoC level. In some aspects, to determine whether the energy transfer limit associated with the vehicle 102 may be reached, the vehicle 102 may calculate a total amount of energy that may be required to be transferred to the house 104 for the entire high electricity cost/energy demand/tariff time duration based on the first amount of energy and the high electricity cost/energy demand/tariff time duration. The vehicle 102 may then determine a difference between the calculated total amount of energy and the vehicle battery SoC level. When the total amount of energy may be greater than the vehicle battery SoC level or the difference between the vehicle battery SoC level and the calculated total amount of energy may be less than a predefined energy transfer threshold (that may be preset by the user), the vehicle 102 may determine that the energy transfer limit associated with the vehicle 102 may be reached within the high electricity cost/energy demand/tariff time duration. For example, if the user desires a minimum of 30% vehicle battery SoC level and/or a minimum vehicle range of 100 miles (e.g., as the predefined energy transfer threshold) and the vehicle 102 determines that the vehicle battery SoC level may drop below the 30% level and/or the vehicle range may drop below 100 miles within the high electricity cost/energy demand/tariff time duration by transferring the first amount of energy to the house 104, the vehicle 102 may determine that the energy transfer limit may be reached within the high electricity cost/energy demand/tariff time duration.

Responsive to determining that the vehicle 102 may be required to disconnect from the charger point 106 at any time between the high electricity cost/energy demand/tariff time duration (as described above) and/or the energy transfer limit may be reached within the high electricity cost/energy demand/tariff time duration, the vehicle 102 may precool the house 104. Specifically, in this case, responsive to the determination described above, the vehicle 102 may determine that the vehicle 102 may be required to precool the house 104 so that when the power grid begins to supply energy to the house 104 when the vehicle 102 may have to stop the energy transfer, the house 104 may not be required to extract/draw considerable amount of energy from the power grid during the high electricity cost/energy demand/tariff time duration, thereby optimizing user's spend on energy drawn from the power grid.

When the vehicle 102 determines that the vehicle 102 may have to precool the house 104, the vehicle 102 may determine a "second amount of energy" that the vehicle 102 may be required to transfer to the house 104, a time duration of transfer of the second amount of energy to the house 104, and a start time of transfer of the second amount of energy to the house 104. In some aspects, the vehicle 102 may calculate the second amount of energy based on the real-time house temperature, the minimum acceptable house temperature (or the maximum acceptable house temperature if the HVAC system may be heating, and not cooling, the house 104), the ambient temperature and the HVAC load profile. Since the minimum acceptable house temperature may be less than the set point temperature, the second amount of energy may be greater than the first amount of energy. In some aspects, the vehicle 102 may precool the house 104 to temperatures even below the minimum acceptable house temperature, when the house 104 may be expected to be unoccupied when the vehicle 102 may be precooling the house 104.

In some aspects, the vehicle 102 may determine the start time of transfer of the second amount of energy to the house 104 based on the expected vehicle departure time from the house 104. As an example, the start time may be 15 or 30 minutes before the expected vehicle departure time. The start time may also depend on the time duration of transfer of the second amount of energy to the house 104. The time duration may depend on an expected trip time duration (that may be part of the vehicle availability information) associated with the vehicle 102. For example, when the vehicle 102 may be expected to take a short trip and may be expected to return to the house 104 to transfer energy to the house 104, the time duration may be smaller. On the other hand, when the vehicle 102 may be expected to take a longer trip or may not be expected to return to the house 104 within the high demand/tariff time duration, the time duration may be relatively longer.

In further aspects, the start time and/or the time duration may depend on the vehicle battery SoC level and/or the time at which the vehicle 102 may be expected to reach to the energy transfer limit. In additional aspects, if the house 104 has another vehicle (e.g., a second vehicle, shown as vehicle 206 in FIG. 2) that may be configured to transfer energy to the house 104 when the vehicle 102 may be away from the house 104 or when the energy transfer limit associated with the vehicle 102 may be reached, the start time and/or the time duration to precool the house 104 may depend on second vehicle's availability information and/or second vehicle battery's SoC level.

By automatically precooling the house 104, the vehicle 102 assists in conserving or minimizing amount of energy required to be drawn from the power grid during the high demand/tariff time duration, thus minimizing user's spend on energy. Further details of the vehicle 102 are described below in conjunction with FIG. 2.

The vehicle 102 implements and/or performs operations, as described here in the present disclosure, in accordance with the owner manual and safety guidelines. In addition, any action taken by the user based on recommendations or notifications provided by the vehicle 102 should comply with all the rules specific to the location and operation of the vehicle 102 (e.g., Federal, state, country, city, etc.). The recommendation or notifications, as provided by the vehicle 102 should be treated as suggestions and only followed according to any rules specific to the location and operation of the vehicle 102.

Figure 2:
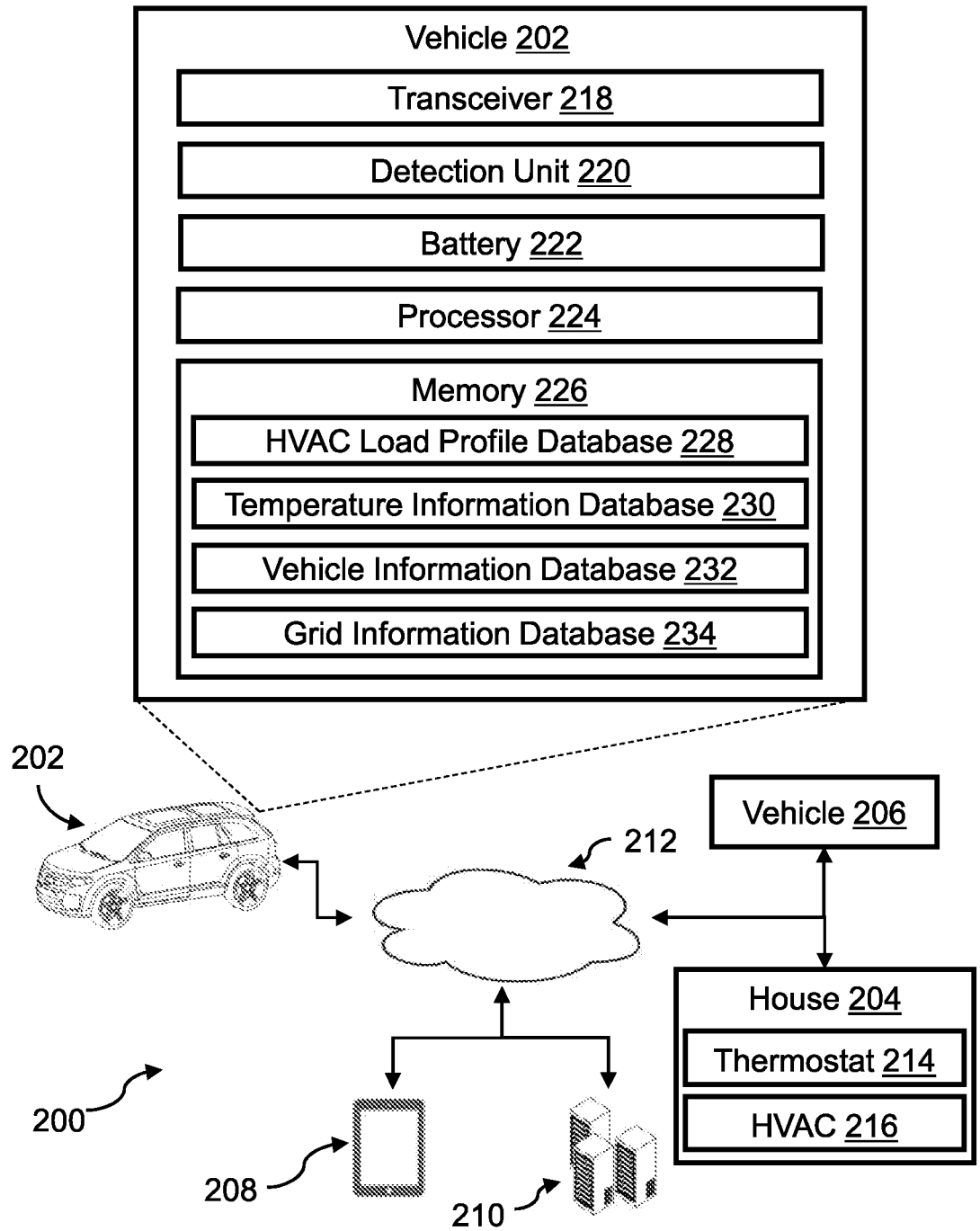
FIG. 2 depicts a block diagram of an example system to enable energy transfer from a vehicle to a building in accordance with the present disclosure.

FIG. 2 depicts a block diagram of an example system 200 to enable energy transfer from a vehicle 202 to a building 204 (or house 204) in accordance with the present disclosure. The vehicle 202 may be same as the vehicle 102 and the house 204 may be same as the house 104, described above in conjunction with FIG. 1. FIG. 2 will be described in conjunction with FIGS. 3-8.

The system 200 may include the vehicle 202, the house 204, a vehicle 206 (e.g., a second vehicle), a user device 208, one or more servers 210 (or a server 210) communicatively coupled with each other via one or more networks 212 (or a network 212). The vehicle 206 may be configured to transfer energy to the house 204 either independently or along with the vehicle 202. In some aspects, the vehicle 206 may be similar to the vehicle 202.

The house 204 may include a thermostat 214 and an HVAC system 216 (or HVAC 216) that may be communicatively coupled with the vehicles 202, 206, the user device 208 and the server 210 via the network 212. The thermostat 214 may be configured to receive user's inputs associated with the set point temperature, minimum and maximum acceptable house temperatures (as described above in conjunction with FIG. 1) and transmit the set point temperature and the minimum and maximum acceptable house temperatures to the vehicles 202, 206 via the network 212. The thermostat 214 may also be configured to measure the real-time house temperature and transmit the house temperature to the vehicles 202, 206. The thermostat 214 may be further configured to control HVAC operation (e.g., switch OFF or ON the HVAC 216) based on command signals received from the vehicles 202, 206, the user device 208 and/or the server 210.

The user device 208 may be associated with a vehicle owner or a house owner (who may be same or different). The user device 208 may include, but is not limited to, a mobile phone, a laptop, a computer, a tablet, a wearable device, or any other similar device with communication capabilities. The server 210 may be part of a cloud-based computing infrastructure and may be associated with and/or include a Telematics Service Delivery Network (SDN) that provides digital data services to the vehicles 202, 206 and other vehicles (not shown in FIG. 2) that may be part of a commercial vehicle fleet. In further aspects, the server 210 may be associated with a firm that supplies energy to the house 204 via the power grid. In this case, the server 210 may be communicatively coupled with the thermostat 214 and may obtain information associated with the house temperature, the set point temperature, and/or the like from the thermostat 214 at a predefined frequency. Further, the server 210 may transmit the information obtained from the thermostat 214 to the vehicles 202, 206 at a predefined frequency. Furthermore, in this case, the server 210 may transmit demand information associated with the power grid to the vehicles 202, 206 at a predefined frequency. In some aspects, the demand information may include tariff information associated with energy drawn from the utility power grid at different times of the day and information associated with a predefined time duration of high energy demand or high tariff associated with the energy drawn from the utility power grid (i.e., the high electricity cost/energy demand/tariff time durations, described above in conjunction with FIG. 1).

The server 210 may be further configured to store the HVAC load profile associated with the HVAC 216 and may transmit the HVAC load profile to the vehicles 202, 206 at a predefined frequency, or when the vehicles 202, 206 transmit a request to the server 210 to obtain the HVAC load profile. In additional aspects, the server 210 may be associated with a firm that provides weather related information to the vehicles 202, 206. In this case, the server 210 may transmit real-time ambient temperature of a geographical area where the house 204 may be situated to the vehicles 202, 206 via the network 212.

In additional aspects, the server 210 may be configured to store vehicle availability information associated with the vehicle 202 (i.e., "first vehicle availability information") and the vehicle 206 (i.e., "second vehicle availability information"). In some aspects, the vehicle availability information may include one or more of historical vehicle travel information, historical information associated with energy transfer from the vehicles 202, 206 to the house 204, an expected or typical vehicle departure time from the house 204, an expected or typical vehicle return time to the house 204, and an expected vehicle trip duration for each vehicle trip.

The network 212 illustrates an example communication infrastructure in which the connected devices discussed in various embodiments of this disclosure may communicate. The network 212 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, a transceiver 218, a detection unit 220, a battery 222, a processor 224 and a memory 226. The transceiver 218 may be configured to transmit/receive signals/information/data to/from external systems and devices via the network 212. For example, the transceiver 218 may transmit or receive information/signals to or from the vehicle 206, the thermostat 214, the HVAC 216, the user device 208 and/or the server 210, via the network 212. The detection unit 220 may include one or more vehicle sensors including, but not limited to, an ambient temperature sensor, sitting area sensors, vehicle cameras, and/or the like. The detection unit 220 may be further configured to detect a real-time SoC level associated with the battery 222 (or battery SoC level). The battery 222 may be configured to store energy/power that may be used to provide energy to the house 204.

The processor 224 may be disposed in communication with one or more memory devices disposed in communication with the respective computing systems (e.g., the memory 226 and/or one or more external databases not shown in FIG. 2). The processor 224 may utilize the memory 226 to store programs in code and/or to store data for performing aspects in accordance with the disclosure. The memory 226 may be a non-transitory computer-readable storage medium or memory storing a program code that enables the processor 224 to perform operations in accordance with the present disclosure. The memory 226 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the memory 226 may include a plurality of databases including, but not limited to, an HVAC load profile database 228, a temperature information database 230, a vehicle information database 232 and a grid information database 234. The HVAC load profile database may store the HVAC load profile associated with the HVAC 216. The temperature information database 230 may store temperature information that the vehicle 202 may receive from the thermostat 214, the server 210 and/or the ambient temperature sensor associated with the detection unit 220. In some aspects, the temperature information may include the set point temperature associated with the house 204, a real-time temperature associated with the house 204 (or house temperature), a maximum acceptable user temperature and a minimum acceptable user temperature associated with the house 204 (or minimum or maximum acceptable house temperatures), and an ambient temperature associated with a geographical area where the house 204 may be located.

The vehicle information database 232 may store the first vehicle availability information and the second vehicle availability information described above. The grid information database 234 may store the demand information associated with the utility power grid that the vehicle 202 may obtain from the server 210.

The vehicle 206 may also include a plurality of units similar to the plurality of units of the vehicle 202. For the sake of simplicity and conciseness, the units associated with the vehicle 206 are not described here.

In operation, the transceiver 218 may receive the temperature information from the thermostat 214, the server 210 and/or the ambient temperature sensor associated with the detection unit 220, and the demand information associated with the utility power grid from the server 210. The transceiver 218 may then transmit the temperature information and the demand information to respective memory databases for storage purpose. The transceiver 218 may further transmit the temperature information and the demand information to the processor 224. In some aspects, the transceiver 218 may further receive the second vehicle availability information associated with the vehicle 206 from the vehicle 206 or the server 210 and a real-time second vehicle battery SoC level associated with a battery (not shown) of the vehicle 206 directly from the vehicle 206. The transceiver 218 may transmit the second vehicle availability information and the real-time second vehicle battery SoC level to the vehicle information database 232 for storage purpose. The transceiver 218 may additionally receive the HVAC load profile associated with the HVAC 216 from the server 210 and may transmit the HVAC load profile to the HVAC load profile database 228 for storage purpose.

The processor 224 may obtain the temperature information and the demand information from the transceiver 218 (or from respective memory databases). The processor 224 may further obtain the first vehicle availability information, the second vehicle availability information and the real-time second vehicle battery SoC level from the vehicle information database 232, and the HVAC load profile from the HVAC load profile database 228.

Responsive to obtaining the information described above, the processor 224 may determine whether a first predefined condition may be met based on the demand information. In some aspects, the first predefined condition may be met when a current time may be equivalent to a start time of the high electricity cost/energy demand/tariff time duration. Stated another way, the processor 224 may determine that the first predefined condition may be met when the high electricity cost/energy demand/tariff time duration starts, which is shown as time "T1" in FIGS. 3-8.

In the FIGS. 3-8, X-axis depicts time, a first Y-axis 302 depicts an amount of energy per unit time transferred to the house 204 to operate the HVAC 216, a second Y-axis 304 depicts house temperature. A temperature level 306 depicts a minimum acceptable house temperature input by the user on the thermostat 214 and a temperature level 308 depicts a maximum acceptable house temperature input by the user on the thermostat 214. Further, the time "T1" depicts the start time of the high electricity cost/energy demand/tariff time duration and a time "T2" depicts an expected end time of the high electricity cost/energy demand/tariff time duration.

Responsive to determining that the first predefined condition may be met, the processor 224 may determine that the vehicle 202 may be required to transfer energy to the house 204 (e.g., when the vehicle 202 may be electrically coupled with the charger point 106) as the demand/tariff associated with the energy drawn from the power grid may be high (e.g., higher than a predefined threshold). In some aspects, the house 204 may be obtaining energy from the power grid before the time "T1", as shown by a graph segment 310 in FIGS. 3-8. At the time "T1" (or before the time "T1"), the processor 224 may determine/calculate a first amount of energy per unit time that the vehicle 202 may be required to transfer to the house 204 to operate the HVAC 216 based on the temperature information and the HVAC load profile. Specifically, the processor 224 may determine the first amount of energy based on the set point temperature, the real-time house temperature, the real-time ambient temperature and the HVAC profile.

Responsive to determining the first amount of energy, the processor 224 may determine whether the battery 222 may have enough stored energy/vehicle battery SoC level to provide the first amount of energy to the house 204. Specifically, the processor 224 may determine whether the first amount of energy may be less or more than a predefined maximum energy transfer threshold, which may be pre-stored in the memory 226 and/or provided by the user. In some aspects, the predefined maximum energy transfer threshold may be based on the vehicle battery SoC level (or a minimum SoC level or vehicle range that may be acceptable to the user when the vehicle 202 begins to transfer energy to the house 204). Responsive to determining that the first amount of energy may be greater than the predefined maximum energy transfer threshold, the vehicle 202 may determine if the vehicle 206 is available to provide energy to the house 204 and whether the battery SoC level associated with the vehicle 206 is greater than a respective SoC threshold associated with the vehicle 206. Responsive to determining that the vehicle 206 may be available and may have enough battery SoC level (e.g., greater than the SoC threshold), the vehicle 202 may transmit a command signal to the vehicle 206 to transfer energy to the house 204 to operate the HVAC 216, when the vehicle 206 may be electrically coupled with the charger point 106. On the other hand, when the vehicle 206 may not be available or may not have enough SoC level, the vehicle 202 may have the house 204 continue to obtain energy from the power grid.

When the first amount of energy may be less than the predefined maximum energy transfer threshold, the processor 224 may cause the vehicle 202/battery 222 to start transferring the first amount of energy to the house 204 to operate the HVAC 216 at the time "T1" (at this stage, the house 204 may not obtain energy from the power grid), as shown by a graph segment/energy level 312 in FIGS. 3-8.

Figure 6:
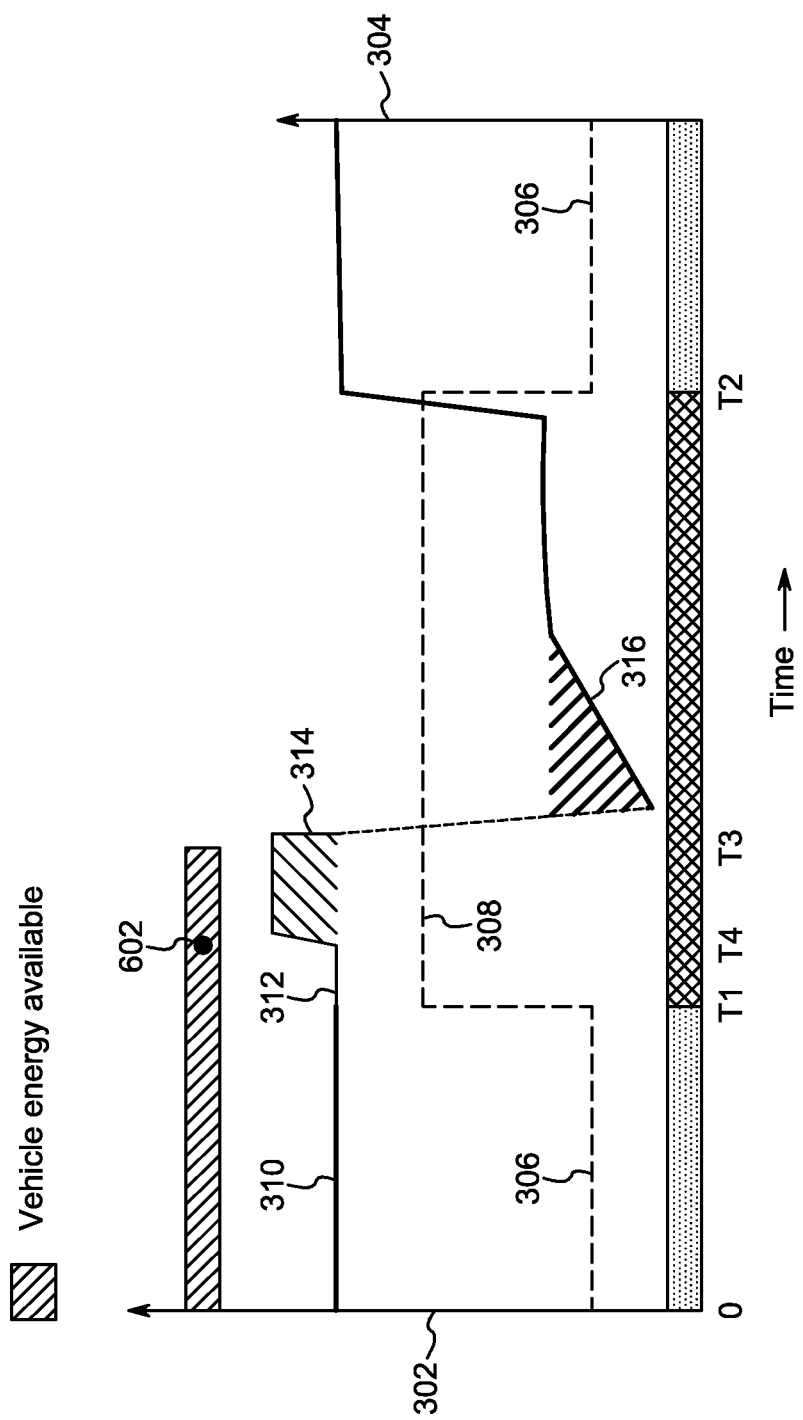
FIG. 6 depicts an example fourth graph illustrating energy transfer to a building with time in accordance with the present disclosure.

When the vehicle 202 may be providing the first amount of energy to the house 104 at or after the time "T1", the processor 224 may determine whether a second predefined condition may be met within the high electricity cost/energy demand/tariff time duration (i.e., between the time "T1" and the time "T2"). In some aspects, the processor 224 may determine that the second predefined condition may be met when an expected vehicle departure time from the house 204 associated with the vehicle 202 (that may be part of the first vehicle availability information) may be within the high electricity cost/energy demand/tariff time duration. An example expected vehicle departure time is depicted in FIGS. 3, 6, 7 and 8 as time "T3". In some aspects, the processor 244 may determine the time "T3" based on the first vehicle availability information (e.g., based on historical vehicle departure times) or based on user inputs. In the latter case, the transceiver 218 may receive the user inputs including the expected vehicle departure time from the house 204 and an expected vehicle return time back to the house 204 via the user device 208 or a vehicle infotainment system (e.g., when the user may have a pre-planned or scheduled trip). In further aspects, the processor 244 may determine the time "T3" when the user activates the vehicle ignition (e.g., remotely) or opens a vehicle driver door, indicating to the processor 224 that the vehicle 202 may depart from the house 204 immediately or within 2-5 minutes (e.g., when the vehicle 202 may be required to depart for an unscheduled trip). As an example, as shown in FIG. 6, if the user performs a remote vehicle ignition activation action 602 at a time "T4", the processor 244 may determine that the vehicle 202 may be required to depart from the house 204 immediately or by the time "T3".

Figure 4:
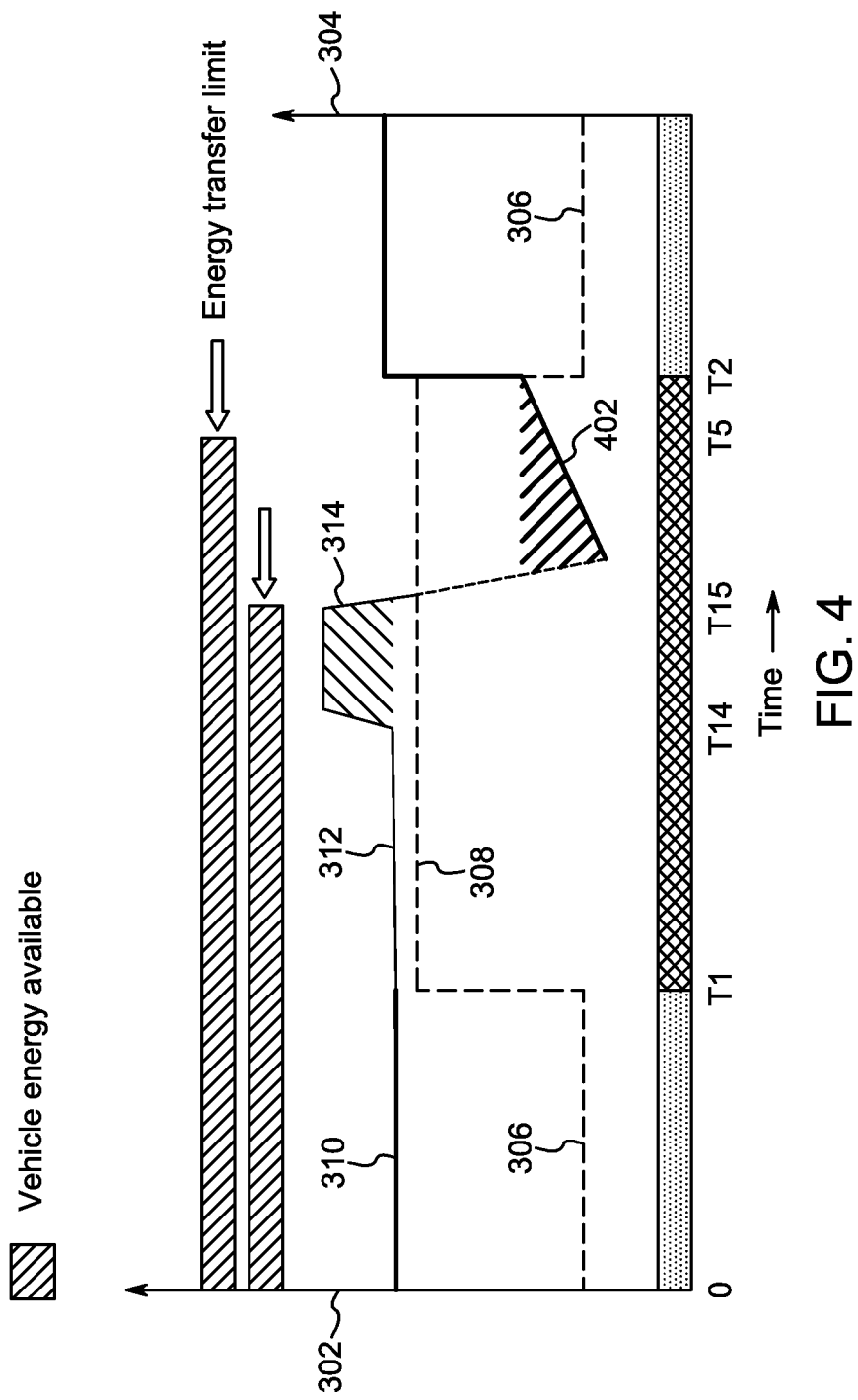
FIG. 4 depicts an example second graph illustrating energy transfer to a building with time in accordance with the present disclosure.

In further aspects, the processor 224 may determine that the second predefined condition may be met when the processor 224 determines that the energy transfer limit associated with the vehicle 102 (as described above in conjunction with FIG. 1) may be reached any time within the high electricity cost/energy demand/tariff time duration, i.e., between the time "T1" and "T2". In this case, to determine whether the energy transfer limit associated with the vehicle 102 may be reached within the high electricity cost/energy demand/tariff time duration, the processor 224 may calculate a total amount of energy that may be required to be transferred to the house 204 to operate the HVAC 216 for the high electricity cost/energy demand/tariff time duration based on the first amount of energy and a difference between the time "T1" and "T2" (i.e., the high electricity cost/energy demand/tariff time duration). Responsive to calculating the total amount of energy, the processor 224 may compare or correlate the total amount of energy with the vehicle battery SoC level. Specifically, the processor 224 may determine an expected vehicle battery SoC level and/or a vehicle range at the end of the high electricity cost/energy demand/tariff time duration (i.e., at the time "T2") based on the calculated total amount of energy and a current/real-time vehicle battery SoC level. When the expected vehicle battery SoC level and/or the vehicle range at the time "T2" may be less than a predefined SoC level threshold or a vehicle range threshold (that may be pre-stored in the memory 226 and provided by the user), the processor 224 may determine that the energy transfer limit associated with the vehicle 202 may be reached within the high electricity cost/energy demand/tariff time duration, e.g., at a time "T5" (that may be less than the time "T2") as shown in FIG. 4. Responsive to such determination, the processor 224 may determine that the second predefined condition may be met.

In some aspects, the processor 224 may determine that the second predefined condition may be met when the total amount of energy may be greater than the real-time vehicle battery SoC level at the time "T1" or when a difference between the real-time vehicle battery SoC level at the time "T1" and the total amount of energy may be less than a predefined energy threshold.

Responsive to determining that the second predefined condition may be met, the processor 224 may determine that the vehicle 202 may not be able to provide the first amount of energy throughout the high electricity cost/energy demand/tariff time duration to the house 204 to operate the HVAC 216. In this case, the processor 224 may determine that the vehicle 202 may be required to precool the house 204 to a temperature lower than the set point temperature, before the vehicle 202 becomes unavailable to transfer energy to the house 204. In some aspects, the processor 224 may precool the house 204 by causing the vehicle 202 to transfer a second amount of energy per unit time (shown as energy level 314 in FIGS. 3-8) to the house 204 for a high energy time duration. In some aspects, the second amount of energy may be greater than the first amount of energy (that is shown as the energy level 312 in FIGS. 3-8), so that the vehicle 202 may precool the house 204 to a temperature lower than the set point temperature (e.g., to the minimum acceptable house temperature that may be part of the temperature information).

In some aspects, the processor 224 may determine/calculate the second amount of energy based on the temperature information, the HVAC profile, and/or a house occupancy information (that the vehicle 202/transceiver 218 may receive from one or more house sensors). As an example, the second amount of energy may be based on the minimum acceptable house temperature, the real-time house temperature, real-time ambient temperature and the HVAC profile. In some aspects, if the house occupancy information indicates that the house 204 may be unoccupied, e.g., when the vehicle 202 departs from the house 204, the processor 224 may precool to a temperature level even lower than the minimum acceptable house temperature.

The processor 224 may determine the high energy time duration, i.e., a high energy start time when the vehicle 202 may start to provide the second amount of energy to the house 204 and a high energy end time when the vehicle 202 may stop/end to provide the second amount of energy to the house 204, based on the first vehicle availability information, the vehicle battery SoC level and/or the second vehicle availability information and the second vehicle battery SoC level. In some aspects, the processor 224 may additionally determine the high energy time duration based on user inputs provided by the user, e.g., via the user device 208 and/or the vehicle infotainment system.

Figure 3:
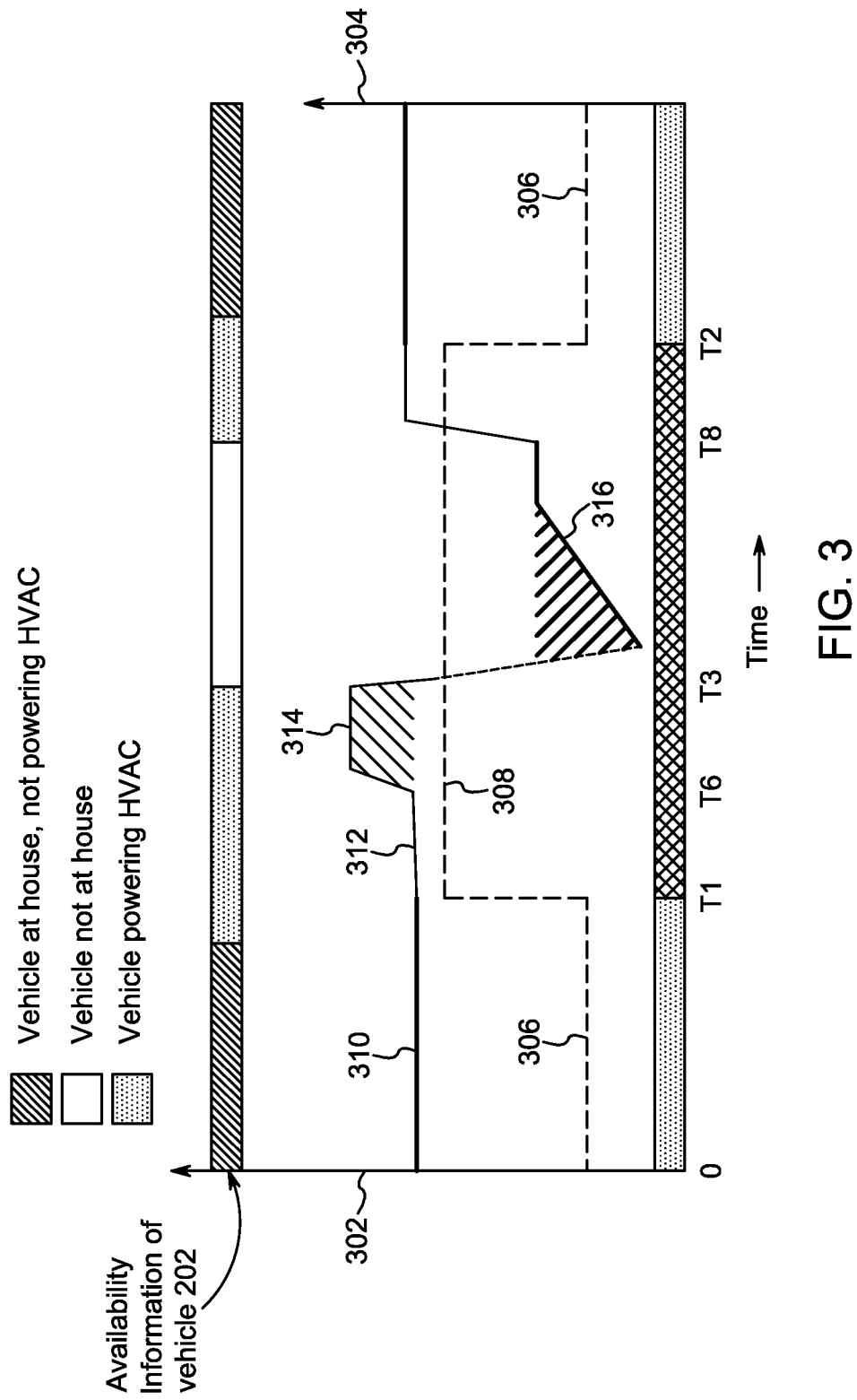
FIG. 3 depicts an example first graph illustrating energy transfer to a building with time in accordance with the present disclosure.

As a first example, as shown in FIG. 3, the vehicle 202 may start to provide the second amount of energy to the house 204 at a high energy start time "T6" and may stop providing the second amount of energy to the house 204 at the time "T3", which may be the expected vehicle departure time from the house 204. In some aspects, the high energy time duration (i.e., a difference between "T3" and "T6") may depend on an expected vehicle trip time duration (as determined from the first vehicle availability information) for which the vehicle 202 may be expected to be away from the house 204 (and not providing energy to the house 204). For example, as shown in FIG. 5, for a long expected vehicle trip time duration, a high energy start time "T7" may be earlier than the high energy start time "T6" that may be associated with a relatively shorter expected vehicle trip time duration.

Responsive to the vehicle 202 providing the second amount of energy for the high energy time duration, the house 204 may get cooled below the set point temperature. When the vehicle 202 leaves the house 204 at the time "T3", the house 204 may start to draw energy from the power grid. Since the house 204 may already be precooled by the vehicle 202, lesser amount of energy may be required from the power grid to cool the house 204 (e.g., till the real-time house temperature reaches to the maximum acceptable house temperature), resulting in optimizing or conserving of energy spend from the power grid, as shown in a graph area 316 in FIGS. 3, 5 and 6.

Figure 5:
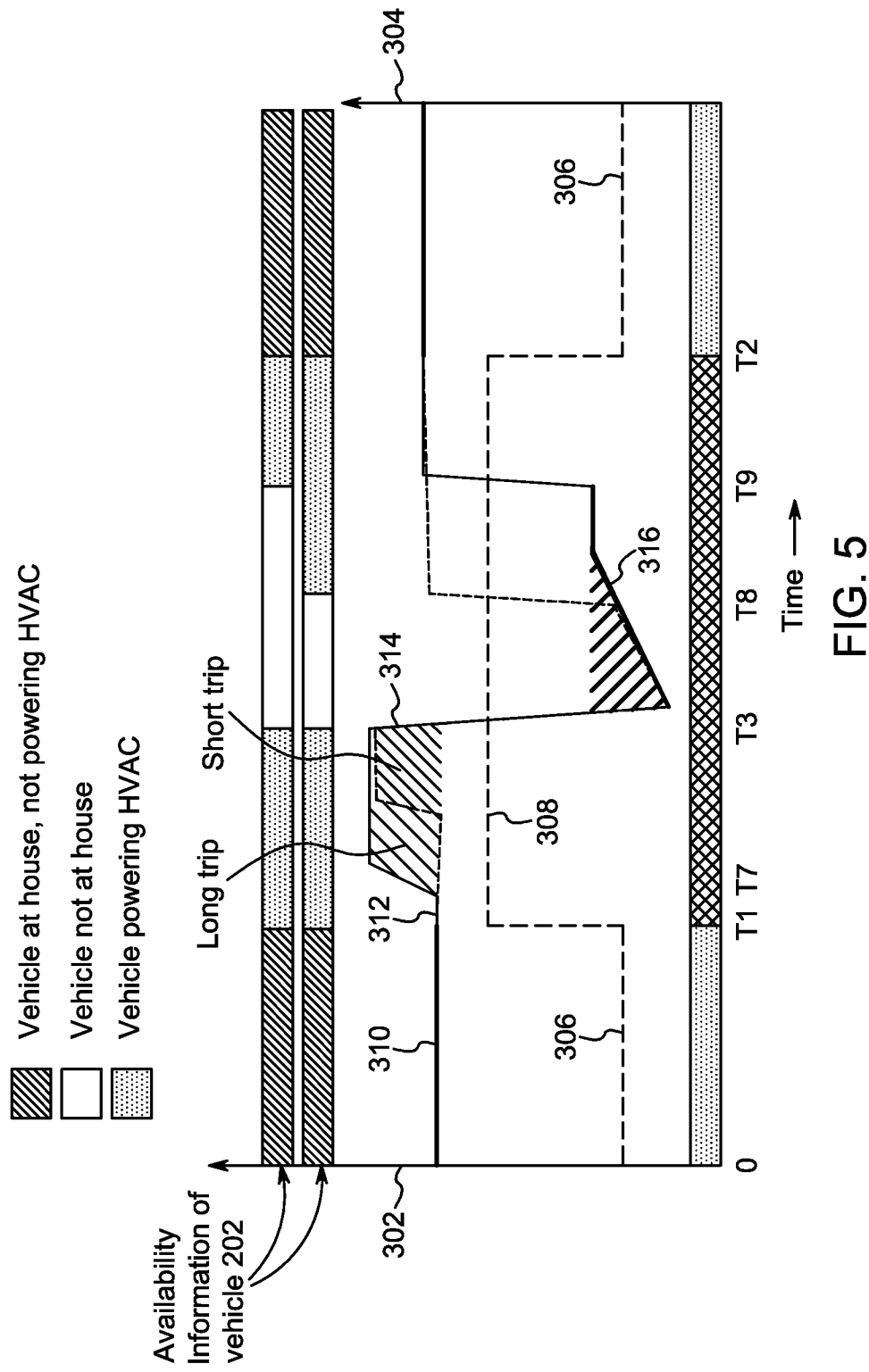
FIG. 5 depicts an example third graph illustrating energy transfer to a building with time in accordance with the present disclosure.

When the vehicle 202 returns to the house 204 at a time "T8" (as shown in FIGS. 3 and 5) from a short trip or at a time "T9" (as shown in FIG. 5) from a long trip, the vehicle 202 may resume to transfer the first amount of energy to the house 204 to operate the HVAC 216 at the set point temperature till the time "T2". From the time "T2" onwards, the house 204 may draw energy from the power grid, until the start for a next high electricity cost/energy demand/tariff time duration.

As a second example, as shown in FIG. 6, when the user provides user inputs indicating the expected vehicle departure time from the house 204 at the time "T4" (e.g., in the form of the remote vehicle ignition activation action 602, or via the user device 208), the processor 224 may cause the vehicle 202 to start to transfer the second amount of energy to the house 104 at the time "T4" till the vehicle 202 departs from the house 204 at the time "T3". In the exemplary aspect depicted in FIG. 6, the vehicle 202 may not be expected to return to the house 104 within the high electricity cost/energy demand/tariff time duration (i.e., before the time "T2") or the user may not input/provide the expected vehicle return time to the vehicle 202/processor 224. In this case, the house 204 may start to draw energy from the power grid when the vehicle 202 departs from the house 204 and may continue to draw energy from the power grid after the time "T2".

Figure 7:
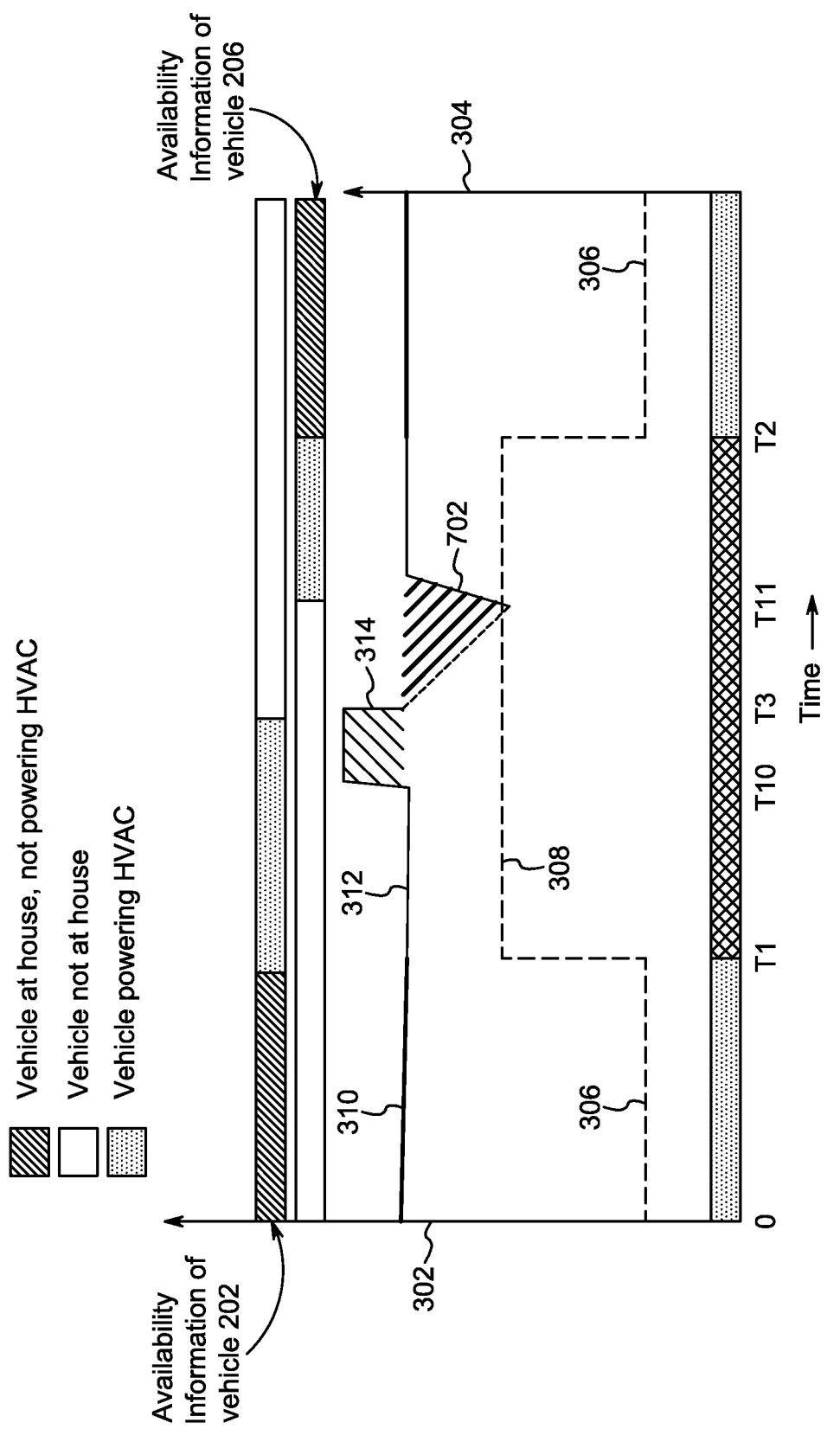
FIG. 7 depicts an example fifth graph illustrating energy transfer to a building with time in accordance with the present disclosure.

As a third example, as shown in FIG. 7, when the processor 224 determines that the vehicle 206 may be available to provide energy to the house 204 when the vehicle 202 may be away and the vehicle 206 may have enough battery SoC level, the processor 224 may cause the vehicle 202 to start transferring the second amount of energy to the house 204 at a high energy start time "T10" till the vehicle 202 departs at the time "T3". In this case, the high energy time duration (i.e., a difference between the time "T3" and "T10") may depend on a time "T11" when the vehicle 206 may be available to transfer energy (e.g., the first amount of energy) to the house 204 to operate the HVAC 216. As shown in FIG. 7, in this exemplary aspect, a graph area 702 depicts an example conserved energy from the power grid. At the time "T11", the vehicle 206 may start to transfer the first amount of energy to the house 204 till the time "T2", at which point the house 204 may start to draw energy from the power grid.

Figure 8:
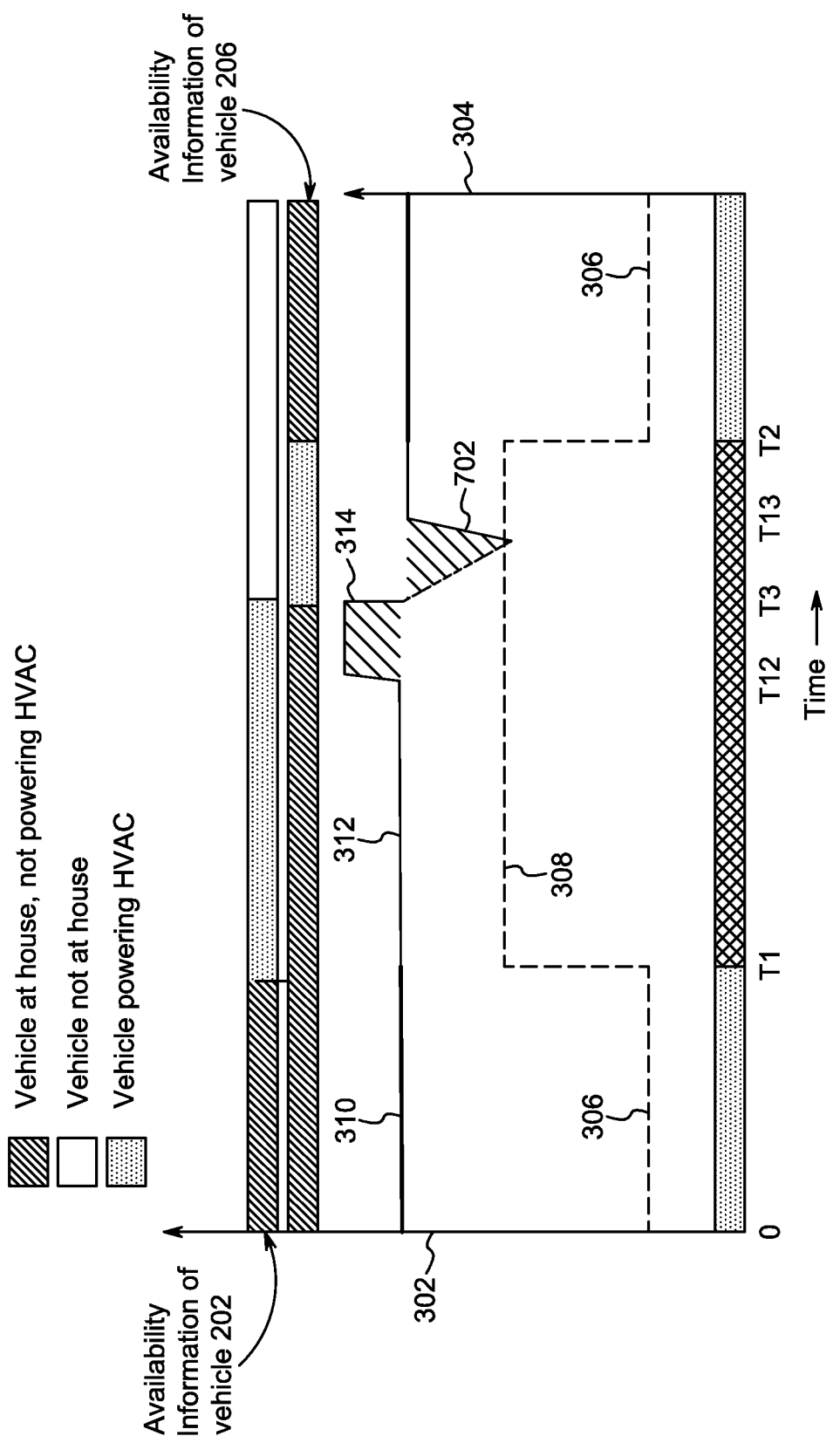
FIG. 8 depicts an example sixth graph illustrating energy transfer to a building with time in accordance with the present disclosure.

As a fourth example, as shown in FIG. 8, when the vehicle 206 may be available in the house 204 but may not have enough battery SoC to transfer the first amount of energy to the house 104 to operate the HVAC 216, the processor 224 may cause the vehicle 202 to start transferring the second amount of energy at a high energy start time "T12" and continue to transfer the second amount of energy till the time "T3" when the vehicle 202 departs from the house 204. Till the time "T3", the vehicle 206 (or the battery associated with the vehicle 206) may get charged. In this case, at a time "T13", the vehicle 206 may start to transfer the first amount of energy to the house 204 and may continue to transfer the energy till the time "T2", at which point the house 204 may start to draw energy from the power grid.

As a fifth example, as shown in FIG. 4, when the processor 224 determines that the energy transfer limit associated with the vehicle 202 may be reached at the time "T5" (that may be earlier than the time "T2"), the processor 224 may cause the vehicle 202 to start to transfer the second amount of energy to the house 204 at a time "T14" and continue to provide the second amount of energy until a time "T15" (which may be earlier than the time "T5"), at which point the energy transfer limit associated with the vehicle 202 may be reached. A person ordinarily skilled in the art may appreciate that since the vehicle 202 starts to transfer the second amount of energy (which is greater than the first amount of energy) to the house 204 at the time "T14", the energy transfer limit is reached sooner (i.e., at the time "T15") than the expected time "T5".

In this case, the house 104 may draw energy from the power grid from the time "T2". An example graph area 402 in FIG. 4 depicts an energy saved from the power grid.

Although the description describes an aspect where the vehicle 202 cools the house 204 via the HVAC 216, a person ordinarily skilled in the art may appreciate that a similar process may be executed by the vehicle 202 when the vehicle 202 heats the house 204 via the HVAC 216.

Furthermore, although the description above describes an aspect where the vehicle 202 precools the house 204 based on the expected vehicle departure time, in some aspects, when the vehicle 202 does not depart from the house 104 at the expected vehicle departure time, the vehicle 202 may transmit a notification to the user device 208 requesting the user to confirm the departure time. In an exemplary aspect, the vehicle 202 may stop precooling the house 104 when a user response to the notification may not be received by the vehicle 202 within a predefined response time duration.

Furthermore, if the vehicle 206 may be expected to be less used by the user for mobility purpose as compared to the vehicle 202, the vehicle 202 may enable the vehicle 206 to transfer the first amount of energy for a greater time duration to the house 104. In addition, if the vehicle 206 has more vehicle battery SoC, the vehicle 202 may enable the vehicle 206 to transfer the first amount of energy for a greater time duration to the house 104. The time duration to transfer the energy to the house 104 may also depend on a health (e.g., wear and tear) of the battery 222.

Figure 9:
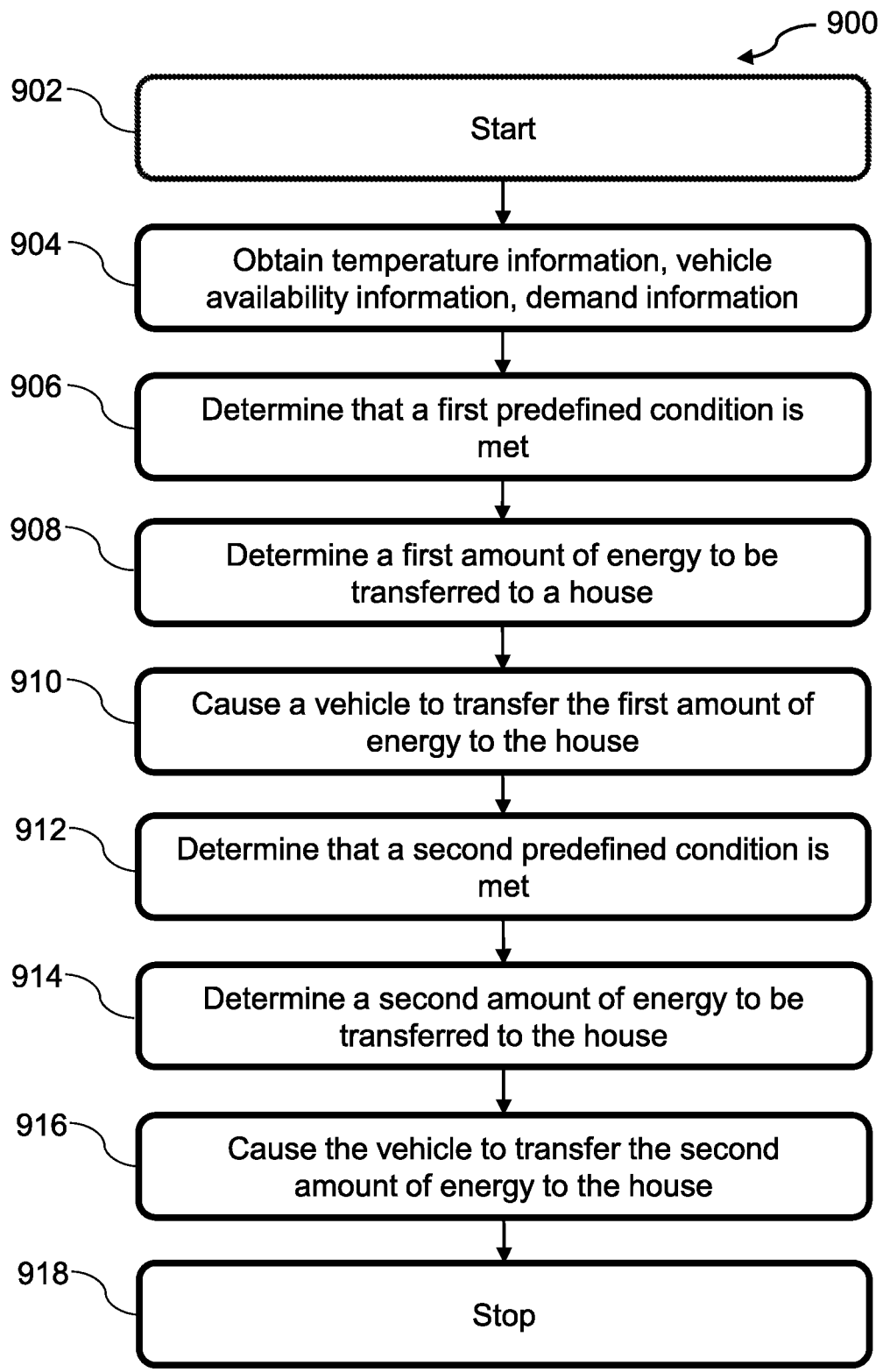
FIG. 9 depicts a flow diagram of an example method for enabling energy transfer from a vehicle to a building in accordance with the present disclosure.

FIG. 9 depicts a flow diagram of an example method 900 for enabling energy transfer from the vehicle 202 to the house 204 in accordance with the present disclosure. FIG. 9 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 900 starts at step 902. At step 904, the method 900 may include obtaining, by the processor 224, the temperature information, the first (and second) vehicle availability information and the demand information. In addition, the processor 224 may obtain the HVAC load profile. At step 906, the method 900 may include determining, by the processor 224, that the first predefined condition may be met based on the demand information. At step 908, the method 900 may include determining, by the processor 224, the first amount of energy to be transferred to the house 204 to operate the HVAC 216 based on the temperature information and the HVAC load profile, responsive to determining that the first predefined condition may be met.

At step 910, the method 900 may include causing, by the processor 224, the vehicle 202 to transfer the first amount of energy to the house 204. At step 912, the method 900 may include determining, by the processor 224, that the second predefined condition may be met based on the first amount of energy, the first vehicle availability information and/or the vehicle battery SoC level, as described above.

Responsive to determining that the second predefined condition may be met, at step 914, the method 900 may include determining, by the processor 224, the second amount of energy to be transferred to the house 204 (e.g., to precool the house 204). At step 916, the method 900 may include causing, by the processor 224, the vehicle 202 to transfer the second amount of energy to the house 204 to precool the house 204.

At step 918, the method 900 ends.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A first vehicle configured to transfer energy to a building, the first vehicle comprising:
   a transceiver configured to receive temperature information associated with the building and demand information associated with a utility power grid;
   a detection unit configured to detect a first vehicle battery state of charge (SoC) level;
   a memory configured to store first vehicle availability information; and
   a processor communicatively coupled with the transceiver, the detection unit and the memory, wherein the processor is configured to:
   determine that a first predefined condition is met based on the demand information;
   determine a first amount of energy to be transferred to the building to operate a building component based on the temperature information, responsive to determining that the first predefined condition is met;
   cause the first vehicle to transfer the first amount of energy to the building;
   determine that a second predefined condition is met based on at least one of the first vehicle availability information, the first vehicle battery SoC level and the first amount of energy;
   determine a second amount of energy to be transferred to the building to operate the building component based on the temperature information responsive to determining that the second predefined condition is met; and
   cause the first vehicle to transfer the second amount of energy to the building.

2. The first vehicle of claim 1, wherein the building component is a heating, ventilation, and air conditioning (HVAC) system of the building.

3. The first vehicle of claim 1, wherein the temperature information comprises a set point temperature associated with the building, a real-time temperature associated with the building, a maximum acceptable user temperature and a minimum acceptable user temperature associated with the building, and an ambient temperature.

4. The first vehicle of claim 1, wherein the demand information comprises electricity cost information associated with energy drawn from the utility power grid and information associated with a predefined time duration of high electricity cost associated with the energy drawn from the utility power grid.

5. The first vehicle of claim 4, wherein the first predefined condition is met when a current time is equivalent to a start time of the predefined time duration.

6. The first vehicle of claim 4, wherein the first vehicle availability information comprises one or more of historical first vehicle travel information, historical information associated with energy transfer from the first vehicle to the building, an expected first vehicle departure time from the building, an expected first vehicle return time to the building, and an expected first vehicle trip duration.

7. The first vehicle of claim 6, wherein the second predefined condition is met when the expected first vehicle departure time is within the predefined time duration.

8. The first vehicle of claim 4, wherein the processor is further configured to:
calculate a total amount of energy required to be transferred to the building to operate the building component for the predefined time duration based on the first amount of energy;
compare the total amount of energy with the first vehicle battery SoC level; and
determine that the second predefined condition is met when the total amount of energy is greater than the first vehicle battery SoC level or a difference between the first vehicle battery SoC level and the total amount of energy is less than a predefined energy threshold.

9. The first vehicle of claim 1, wherein the processor is further configured to:
determine a time duration to transfer the second amount of energy to the building based on the first vehicle availability information; and
cause the first vehicle to transfer the second amount of energy to the building for the time duration.

10. The first vehicle of claim 9, wherein the processor is further configured to determine the time duration based on the first vehicle battery SoC level.

11. The first vehicle of claim 9, wherein the transceiver is further configured to receive second vehicle availability information and a second vehicle battery SoC level associated with a second vehicle configured to provide energy to the building, and wherein the processor is further configured to determine the time duration based on at least one of the second vehicle availability information and the second vehicle battery SoC level.

12. The first vehicle of claim 9, wherein the transceiver is further configured to receive user inputs comprising at least of an expected first vehicle departure time from the building and an expected first vehicle return time to the building, and wherein the processor is further configured to determine the time duration based on the user inputs.

13. The first vehicle of claim 1 further comprising a first vehicle battery configured to provide energy to the building, wherein the first vehicle battery SoC level is associated with the first vehicle battery.

14. The first vehicle of claim 1, wherein the transceiver is further configured to receive a load profile associated with the building component, and wherein the processor is configured to determine the first amount of energy and the second amount of energy based on the load profile.

15. The first vehicle of claim 1, wherein the processor is further configured to:

determine that the first amount of energy is less than a maximum energy transfer threshold, wherein the maximum energy transfer threshold is based on the first vehicle battery SoC level; and
cause the first vehicle to transfer the first amount of energy to the building when the first amount of energy is less than the maximum energy transfer threshold.

16. The first vehicle of claim 1, wherein the transceiver is further configured to receive building occupancy information, and wherein the processor is further configured to determine the second amount of energy based on the building occupancy information.

17. A method to enable energy transfer from a vehicle to a building, the method comprising:
determining, by a processor, that a first predefined condition is met based on demand information associated with a utility power grid;
determining, by the processor, a first amount of energy to be transferred to the building to operate a building component based on temperature information associated with the building, responsive to determining that the first predefined condition is met;
causing, by the processor, the vehicle to transfer the first amount of energy to the building;
determining, by the processor, that a second predefined condition is met based on at least one of vehicle availability information, a vehicle battery state of charge (SoC) level and the first amount of energy;
determining, by the processor, a second amount of energy to be transferred to the building to operate the building component based on the temperature information responsive to determining that the second predefined condition is met; and
causing, by the processor, the vehicle to transfer the second amount of energy to the building.

18. The method of claim 17, wherein the building component is a heating, ventilation, and air conditioning (HVAC) system of the building.

19. The method of claim 17, wherein the temperature information comprises a set point temperature associated with the building, a real-time temperature associated with the building, a maximum acceptable user temperature and a minimum acceptable user temperature associated with the building, and an ambient temperature.

20. A non-transitory computer-readable storage medium having instructions stored thereupon which, when executed by a processor, cause the processor to:
determine that a first predefined condition is met based on demand information associated with a utility power grid;
determine a first amount of energy to be transferred to a building from a vehicle to operate a building component based on temperature information associated with the building, responsive to determining that the first predefined condition is met;
cause the vehicle to transfer the first amount of energy to the building;
determine that a second predefined condition is met based on at least one of vehicle availability information, a vehicle battery state of charge (SoC) level and the first amount of energy;
determine a second amount of energy to be transferred to the building to operate the building component based on the temperature information responsive to determining that the second predefined condition is met; and cause the vehicle to transfer the second amount of energy to the building.

\* \* \* \* \*